(12) United States Patent
Goel et al.

(10) Patent No.: US 10,949,646 B2
(45) Date of Patent: Mar. 16, 2021

(54) PERFORMING AN ITERATIVE BUNDLE ADJUSTMENT FOR AN IMAGING DEVICE

(71) Applicants: Manish Goel, Plano, TX (US); Yuming Zhu, Plano, TX (US)

(72) Inventors: Manish Goel, Plano, TX (US); Yuming Zhu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 16/399,519

(22) Filed: Apr. 30, 2019

(65) Prior Publication Data

US 2020/0349341 A1   Nov. 5, 2020

(51) Int. Cl.
| | | |
|---|---|---|
| *G06K 9/00* | (2006.01) | |
| *G06K 9/62* | (2006.01) | |
| *G06T 7/73* | (2017.01) | |
| *G06T 7/579* | (2017.01) | |

(52) U.S. Cl.
CPC ....... *G06K 9/00201* (2013.01); *G06K 9/6202* (2013.01); *G06T 7/579* (2017.01); *G06T 7/73* (2017.01); *G06T 2207/30244* (2013.01)

(58) Field of Classification Search
CPC combination set(s) only.
See application file for complete search history.

(56) References Cited

U.S. PATENT DOCUMENTS

| | | | |
|---|---|---|---|
| 6,157,747 A | 12/2000 | Szeliski et al. | |
| 6,990,230 B2 | 1/2006 | Piponi | |
| 8,548,225 B2 * | 10/2013 | Jin | G06T 7/593 382/154 |
| 10,776,943 B2 * | 9/2020 | Tamama | G06T 7/97 |
| 2015/0332110 A1 * | 11/2015 | Xin | G06K 9/2081 345/419 |
| 2016/0071278 A1 * | 3/2016 | Leonard | G06T 7/579 348/47 |
| 2016/0196659 A1 * | 7/2016 | Vrcelj | G06T 7/12 382/154 |
| 2017/0337716 A1 * | 11/2017 | Birchfield | G06K 9/00476 |
| 2020/0027236 A1 * | 1/2020 | Tamama | G06F 3/012 |

FOREIGN PATENT DOCUMENTS

WO    2018015716    1/2018

OTHER PUBLICATIONS

Changchang Wu, et al. Multicore Bundle Adjustment in Computer Vision and Pattern Recognition (CVPR) IEEE Conference Jun. 2011.

(Continued)

*Primary Examiner* — Tsung Yin Tsai
(74) *Attorney, Agent, or Firm* — John J. King

(57) ABSTRACT

A method of performing an iterative bundle adjustment for an imaging device is described. The method comprising implementing a plurality of functions in performing a bundle adjustment. Predetermined functions of the plurality of functions may be started using a processor for a second iteration in parallel with a first iteration of the plurality of functions. A result of the predetermined functions started during the first iteration may be used in a second iteration. An output of the bundle adjustment may then be generated for successive iterations.

20 Claims, 6 Drawing Sheets

(56) References Cited

OTHER PUBLICATIONS

Maoteng Zheng et al., "A New GPU Budle Adjustment Method for Large-Scale Data," Photometric Engineering & Remote Sending, vol. 83, No. 9, Sep. 2017.
PCT Search Report, International Application No. PCT/KR/2019/014047, dated Feb. 5, 2020.
Siddharth Chaudhary, Improving the Efficiency of SFM and its Application, Jul. 2012.
Triggs et al., Bundle Ajustment—A Modern Synthesis, 1999.
PCT Search Report, International Application PCT/KR/2019/014047 Feb. 2020.

* cited by examiner

PERFORMING AN ITERATIVE BUNDLE ADJUSTMENT FOR AN IMAGING DEVICE

FIELD OF THE INVENTION

An embodiment of the invention relates generally to capturing images, and in particular, to performing an iterative bundle adjustment for an imaging device.

BACKGROUND OF THE INVENTION

Digital imaging in electronic devices, including mobile devices, is an important aspect of many electronic devices. Many electronic devices may comprise multiple cameras, where the images from the multiple cameras may require image processing to obtain a desirable image.

Bundle Adjustment (BA) is widely used for example in Augmented Reality (AR), Virtual Reality (VR) and computer vision. Applications requiring bundle adjustment include pose estimation, 3D reconstruction, and image stitching, for example. Bundle Adjustment may often be the most computation intensive part of an image processing pipeline. Therefore, reducing the latency for Bundle Adjustment is significant in enabling a higher system frame rate.

Accordingly, there is a need for methods and devices that improve the performance of digital imaging, including Bundle Adjustment in digital imaging.

SUMMARY OF THE INVENTION

A method of performing an iterative bundle adjustment for an imaging device is described. The method comprises implementing a plurality of functions in performing a bundle adjustment. Predetermined functions of the plurality of functions may be started, using a processor, for a second iteration in parallel with a first iteration of the plurality of functions. The result of the predetermined functions started during the first iteration may be used in a second iteration. An output of the bundle adjustment may then be generated for successive iterations.

An imaging device performing an iterative bundle adjustment is also described, where the imaging device may comprise a processor configured to implement a plurality of functions in performing the bundle adjustment. The processor may also start predetermined functions of the plurality of functions for a second iteration in parallel with a first iteration of the plurality of functions; use the result of the predetermined functions started during the first iteration in a second iteration; and generate an output of the bundle adjustment for successive iterations.

A non-transitory computer-readable storage medium having data stored therein representing software executable by a computer for performing an iterative bundle adjustment may comprise implementing a plurality of functions in performing a bundle adjustment; starting predetermined functions of the plurality of functions for a second iteration in parallel with a first iteration of the plurality of functions; using the result of the predetermined functions started during the first iteration in a second iteration; and generating an output of the bundle adjustment for successive iterations.

DETAILED DESCRIPTION OF THE DRAWINGS

Figure 1:
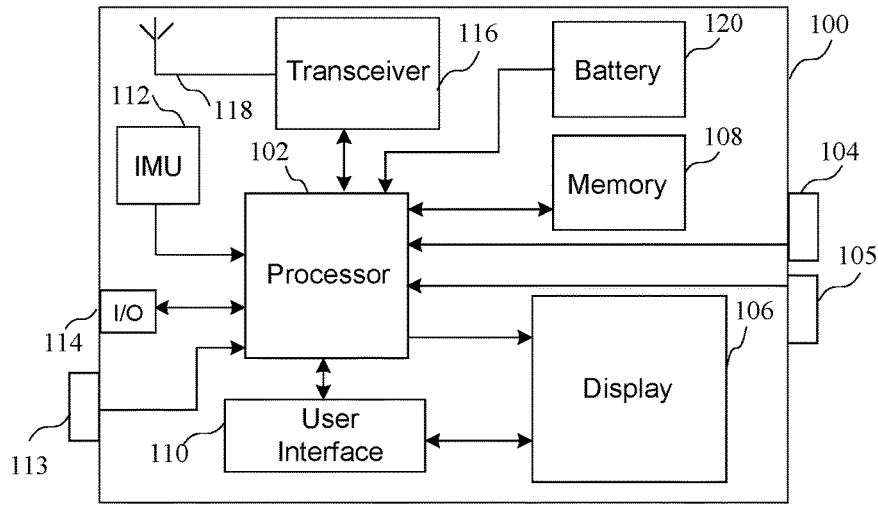
FIG. 1 is an exemplary block diagram of an electronic device having a plurality of imaging devices.

The circuits and methods set forth below reduce the latency of a Bundle Adjustment operation, such as in a device receiving images. Bundle Adjustment generally relates to an adjustment of camera parameters for multiple cameras based upon the reflection of light from objects received by the cameras. A Bundle Adjustment operation comprises a plurality of image processing steps that may be operated sequentially. Unlike conventional Bundle Adjustment operations used in AR, VR or computer vision as a backend optimization tool and which are often the bottleneck for achieving high system update rates for many applications, the circuits and methods set forth below enable a start of next iteration of a Bundle Adjustment operation in parallel with the current iteration, and may be described as Look-ahead Bundle Adjustment. According to some implementations, some steps of image processing, such as Jacobian and Hessian (J&H) execution for a next iteration, is started in parallel (i.e. a "look-ahead" operation) to a Cost function and high-level Iterative Control (which may be for example a Levenberg-Marquardt (LM) control) during a current iteration with the assumption that the corresponding solution will be accepted. Intermediate results can be saved and reused across iterations. Further, Jacobian and Hessian outputs for an accepted solution can be saved and can be restored across iterations.

There may also be a parallel execution of multiple branches (referred to below as P branches) of a solve operation. With the same Jacobian and Hessian output, one or multiple (P) branches of Solve and Cost functions can be run with different system parameters, for example with a different mu value related to a search scope, as will be described in more detail below. The parallel factor P (i.e. the number of branches running in parallel) can also be adaptive in run-time.

A modified high-level Iterative Control (e.g. LM control) can be implemented, where an iterative control block can Accept/Abort/Rerun/Restore a Jacobian and Hessian operation based on Cost results for all P branches. One advantage of the circuits and methods is that they lead to a reduction in latency for a bundle adjustment operation, particularly in cases where there are bursts of success iterations or bursts of failed iterations (i.e. multiple of consecutive iterations has the same status of success or fail). When an iteration fails, a next iteration can use a previous valid solution of a given function for a next iteration.

The embodiments of the circuits and methods can implement the described functions in a CPU, GPU, custom HW architecture (HWA), or a combination of elements of elements of an integrated circuit device. The embodiments of the circuits and methods can exploit the parallelism within each of the functions to accelerate its execution. In one embodiment, the branches may be running in parallel in different hardware (e.g. a CPU core, GPU, HWA). The LM control can check the Cost results in a particular order. In some embodiments, the branches may be running in the same shared hardware. The branches may be run in a predetermined order, where the LM control can check the cost after each branch is finished. Operation of remaining branches can be aborted if a success condition is met for a current branch. In some embodiments, the number of parallel branches is fixed. In other embodiments, the number of parallel branches may be modified across iterations according to a system strategy.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Before describing the figures in more detail below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C; A and B; A and C; B and C; and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Turning first to FIG. 1, a block diagram of an electronic device having multiple cameras is shown. The exemplary electronic device 100, which may be a mobile device for example, may be any type of device having one or more cameras, such as a digital camera, a wireless communication device such as cellular telephone, a mobile computer device such as laptop or tablet computer, or a head mounted device (HMD). Elements of the electronic device, alone or in combination with other elements separate from the electronic device, may be used to perform iterative bundle adjustment. The electronic device 100 may comprise a processor 102 coupled to a plurality of cameras 104 and 105. The cameras 104 and 105 may have different image processing characteristics, such as different focal lengths or shutter characteristics. While two cameras are shown by way of example, it should be understood that more than 2 cameras could be implemented. Alternatively, multiple images can be captured at different timers using a single camera. The processor 102, alone or in combination with other elements on the electronic device or external to the electronic device, may be used for capturing a photograph (also commonly called a photo) as described in more detail below. While cameras 104 and 105 are shown, it should be understood that the cameras comprise image recording devices, such as image sensors, and that the cameras may be independent of each other or may share circuitry. The processor 102 is an integrated electronic circuit such as, for example, an ARM processor, an X86 processor, a MIPS processor, a graphics processing unit (GPU), a general-purpose GPU, or any other processor configured to execute instructions stored in a memory. The processor 102 could be implemented in one or more processing devices, where the processors may be different. For example, the electronic device could include a central processing unit (CPU) as well as a GPU for example.

The processor 102 may be coupled to a display 106 for displaying information to a user. The processor 102 may also be coupled to a memory 108 that allows storing information related to data or information associated with achieving a goal. The memory 108 could be implemented as a part of the processor 102, or could be implemented in addition to any cache memory of the processor, as is well known. The memory 108 could include any type of memory, such as a solid state drive (SSD), Flash memory, Read Only Memory (ROM) or any other memory element that provides long term memory, where the memory could be any type of internal memory of the electronic device or external memory accessible by the electronic device.

A user interface 110 is also provided to enable a user to both input data and receive data. The user interface could include a touch screen user interface commonly used on a portable communication device, and other input/output (I/O) elements, such as a speaker and a microphone. The user interface could also comprise devices for inputting or outputting data that could be attached to the mobile device by way of an electrical connector, or by way of a wireless connection, such as a Bluetooth or a Near Field Communication (NFC) connection.

The processor 102 may also be coupled to other elements that receive input data or provide data, including various sensors 111, an inertial measurement unit (IMU) 112 and a Global Positioning System (GPS) device 113 for activity tracking. For example, an inertial measurement unit (IMU) 112, which may include a gyroscope and an accelerometer for example, can provide various information related to the motion or orientation of the device, while GPS 113 provides location information associated with the device. The sensors, which may be a part of or coupled to a mobile device, may include by way of example a light intensity (e.g. ambient light or UV light) sensor, a proximity sensor, an environmental temperature sensor, a humidity sensor, a heart rate detection sensor, a galvanic skin response sensor, a skin temperature sensor, a barometer, a speedometer, an altimeter, a magnetometer, a hall sensor, a gyroscope, WiFi transceiver, or any other sensor that may provide information to the mobile device. The processor 102 may receive input data by way of an input/output (I/O) port 114 or a transceiver 116 coupled to an antenna 118. While the electronic device of FIG. 1 is shown by way of example, it should be understood that other electronic devices having other combinations of elements than those shown, including for example additional cameras or additional or different sensors for tracking the movement of the electronic device. Further, performing iterative bundle adjustment for an imaging device can be implemented using elements of the electronic device such as the processor and remote elements, such as elements of a server in communication with the electronic device.

Figure 2:
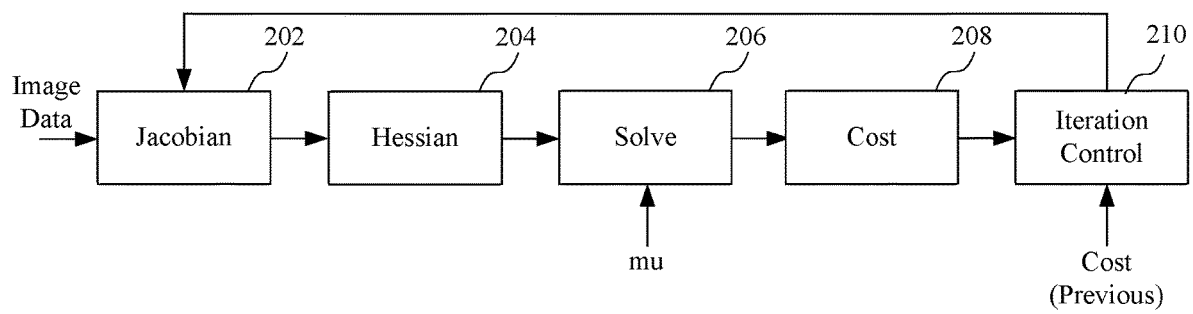
FIG. 2 is an exemplary block diagram showing an exemplary sequence of steps for bundle adjustment.

Turning now to FIG. 2, a block diagram shows an exemplary sequence of steps for bundle adjustment, which may be performed using the processor 102 along with other elements of the electronic device 100. A Jacobian function block 202 performs a Jacobian operation on image data (where the image data may be received from multiple cameras for example) during a bundle adjustment operation, and output of which is provided to a Hessian function block 204 that performs a Hessian operation on the output. An output of the Hessian function block 204 is provided to a Solve block 206 that is also coupled to receive a coefficient mu. As will be described in more detail below, the mu value can be used for controlling a search scope, such as for implementing trust region strategies. An output of the Solve block 206 is provided to a Cost block 208. The operations of the Solve block 206 and the Cost function block 208 are described in more detail in reference to FIGS. 4-9. An Iteration Control (IC) block 210 provides iteration control, and may be implemented for example by a Levenberg-Marquardt (LM) control block that is configured to receive an output of the Cost function block and a previous cost value. While LM control is one example of iteration control, it should be understood that other iterative control functions could be implemented. An output of the iteration control block 210 is also feed back to the Jacobian function block 202.

A Bundle Adjustment operation may comprise an iterative, non-linear optimization process and generally may contain functions in two levels. In a low level (i.e. within an iteration), several functions may be run sequentially, such as Jacobian, Hessian, Solver and Cost compute functions, for performing image processing. The Jacobian of a function is a matrix of the first partial derivative of the function, and may generally describe an amount of rotation, transformation and stretching. The Hessian of a function is the Jacobian of the function's gradient, and generally describes local curvature of a function of many variables. By way of example, the Hessian function can be represented by $H=J^T \cdot J$. The Solver block can solve a normal equation $(H+\mu \cdot \text{diag}(H)) \cdot \delta X = J^T e$ and obtain new candidate solution $X_{new} = X + \delta X$, where X is an output of the solver block, which may represent a normal equation and is used to update a candidate solution $X_{new}$. Alternatively, the Solver block can solve a normal equation $(H+\mu \cdot I) \cdot \delta X = J^T e$, where I is the identity matrix. Bundle Adjustment minimizes the squared Mahalanobis distance $e^T e$ over parameters space X. As will be described in more detail below, the cost is then computed for a current iteration based on $X_{new}$ and represents a minimum error value associated with a vector parameter based upon 3D points captured by the camera and a measurement vector associated with measured image coordinates for all cameras. The cost function will be described in more detail below in reference to FIG. 3. While a combination of a Jacobian and Hessian blocks are shown by way of example to provide second order image processing, it should be understood that other image processing blocks could be implemented.

At a high level, iteration control may be performed using "trust region" strategies (i.e. a mathematical optimization to denote the subset of the region of an objective function that is approximated using a model function). If an adequate model of the objective function is found within the trust region, then the region is expanded, whereas the region is contracted if the approximation is poor. The region can be expanded or contracted using the variable mu ($\mu$) provided to the Solve block 206, as will be described in more detail below. Commonly used iterative control based upon trust region strategies include LM and Dogleg iteration control for example. Using LM iteration control for example, the cost of a current iteration is compared with previous iterations to decide whether to accept or reject the current solution, where convergence criteria is checked by the LM control block. If the cost of current iteration is smaller than previous iteration, then the iteration is a success. The LM control block may then reduce mu (e.g. divide by a factor Kd to decrease search radius) and accept the new solution from the iteration. In contrast, if the cost of current iteration is not smaller than the previous iteration, it is failed. The LM control block may then increase mu (e.g. multiply by a factor Ki to increase search radius) and reject the solution and reuse the last accepted solution for the next iteration. Because the sequential nature of the individual functions, the total delay may be based upon a number of iterations multiplied by the time taken by each iteration, where each iteration has sequential execution of its functions. While individual functions (e.g. Jacobian or Hessian) can be accelerated by using parallel branches, iteration control using trust region strategies can also improve performance during image processing.

Figure 3:
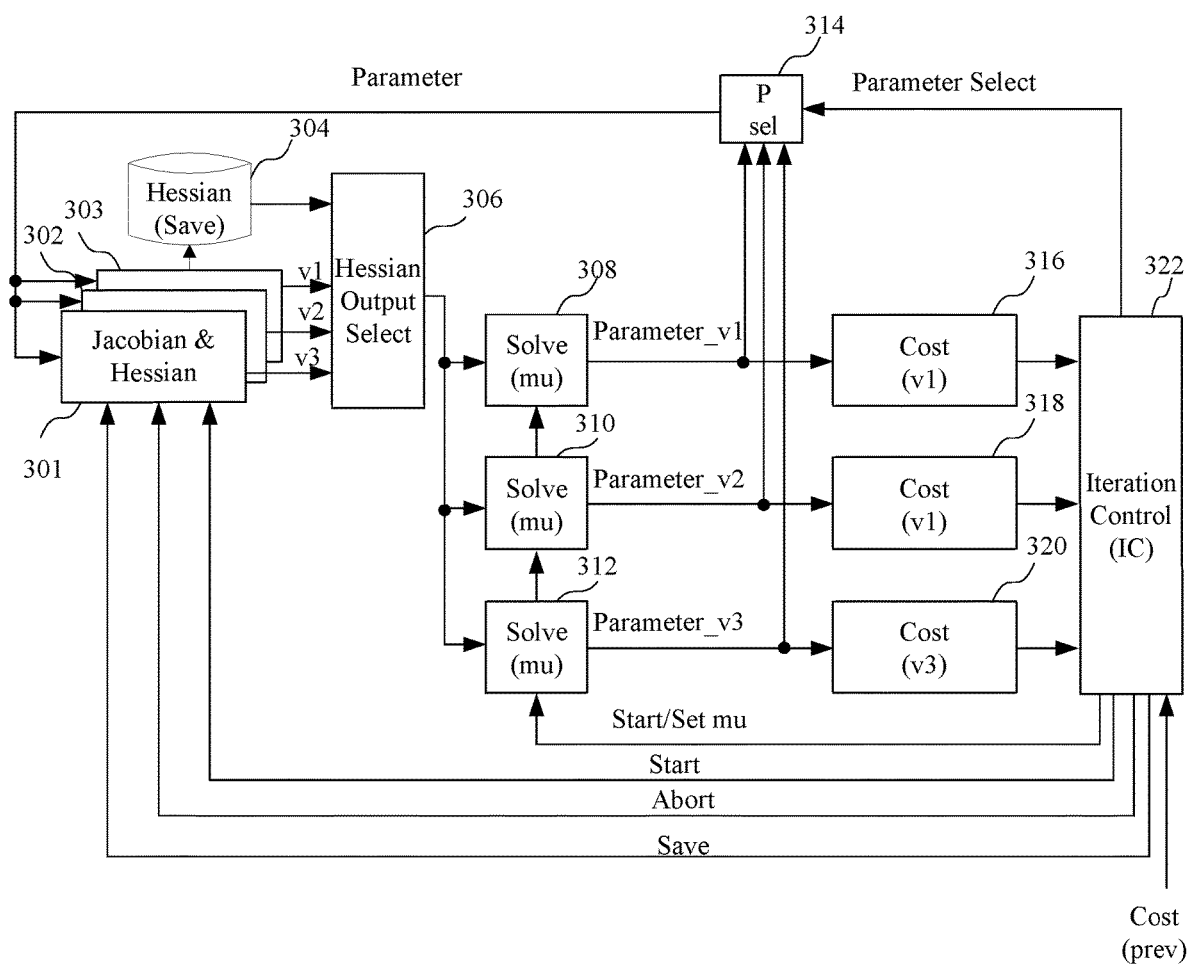
FIG. 3 is an exemplary block diagram showing an iterative bundle adjustment operation.

Turning now to FIG. 3, an exemplary block diagram shows an iterative bundle adjustment operation. The iterative bundle adjustment of FIG. 3 includes the functions shown in the blocks of FIG. 2, where the individual blocks are described in more detail and in conjunction with other elements. It should be noted that in some cases functional blocks of FIG. 2 may be included in a single block, such as here where the Jacobian and Hessian functions are shown as being included together in Jacobian and Hessian blocks. Further, it should be noted that certain blocks may be implemented in a plurality of stages as will be described in more detail below. As shown in FIG. 3, Jacobian and Hessian function blocks 301-303 provide signals to a Hessian Output Selection circuit 306, an output of which is provided to Solve blocks 308, 310, and 312. Each of the Solve blocks generates a parameter value, shown here as Parameter_v1, Parameter_v2, and Parameter_v3. The parameter values are provided to a parameter select circuit 314, which selects a parameter. The parameter values are also provided to corresponding Cost Function blocks. More particularly, the output parameter generated by the Solve block 308 is provided to a Cost Function block 316, the output of the Solve 310 block is provided to a Cost Function block 318, and the output of the Solve block 312 is provided to a Cost Function block 320. An Iteration Control block 322 is coupled to receive outputs of the Cost Function block 316, the Cost Function block 318 and the Cost Function block 320, and a previous Cost value.

The Iteration Control block 322 provides the main control for the functions. It controls the input parameter from the P select circuit 314 for the Jacobian and Hessian function based upon a Parameter Select value. It also provides Start, Abort and Save signals to the Jacobian and Hessian blocks 301-303 to control Jacobian and Hessian outputs to be saved, and which Jacobian and Hessian output to be passed to the Solve and Cost branches, as will be described in more detail below in reference to FIGS. 4-9. In the first iteration, only one Jacobian and Hessian block may be run with an input parameter. In subsequent iterations, there can be P branches of Jacobian and Hessian blocks running in parallel, shown here by way of example with P=3 for the Jacobian and Hessian blocks 301-303, with an input parameter from "P Sel" module. The Solve modules 308-312 may solve the "normal equation" for the Hessian output $(H+\mu \cdot diag(H)) \cdot \delta X = J^T e$ and update a candidate solution $X_{new}=X+\delta X$ for example, where X represents a candidate solution and $X_{new}$ represents an updated candidate solution. The P branches of the Solve blocks, shown here where P=3, may use the same Hessian output and the same right hand side solve and cost functions, the only difference may be the choice of mu value. It can be assumed that the Ki incremental ratio for all branches is fixed for convenience, although the Ki incremental ratio could be adjusted. Cost modules compute the cost based on $X_{new}$ from the corresponding Solve module.

As set forth above, Bundle Adjustment refers to the adjustment of bundles of rays that leave 3D feature points onto each camera centers with respect to multiple camera positions and point coordinates. It produces jointly an optimal 3D structure and viewing parameters by minimizing the cost function for a model fitting error. The re-projection error between the observed and the predicted image points, which is expressed for m images and n points as $$\text{Error}(P, X) = \sum_{i=0}^{n} \sum_{j=1}^{m} d(Q(P_j, X_i), X_{ij})^2 \qquad (1)$$

where Xij represents a measured projection of point i on the image j, $Q(P_j; X_i)$ is the predicted projection of point ion image j and d(x; y) the Euclidean distance between the inhomogeneous image points represented by x and y. Using the reprojection error, the cost function is defined as, $$\text{Cost}(P;X) = \min_{P,X} \text{Error}(P;X) \qquad (2)$$

According to various aspects of the invention, different numbers of branches can be used. However, additional branches require some additional circuits, and therefore requires additional circuit footprint and power. When a number of branches are implemented, it may be beneficial to operate only a number of those branches, depending upon the results of the various stages, including the cost function for example. As will be described in more detail below, different numbers of branches can be implemented, and it can be determined whether all of the branches should be used based upon the cost results generated.

When the circuit of FIG. 3 is operated, there may be different outputs (i.e. successful iterations and failed iterations), and therefore different requirements for circuits to be implemented. FIGS. 4-9 describe different scenarios of operation of the circuit of FIG. 3 to show how different numbers of branches can be selected and how different numbers of branches can lead to improvements in a Bundle Adjustment operation when using a look-ahead operation.

Figure 4:
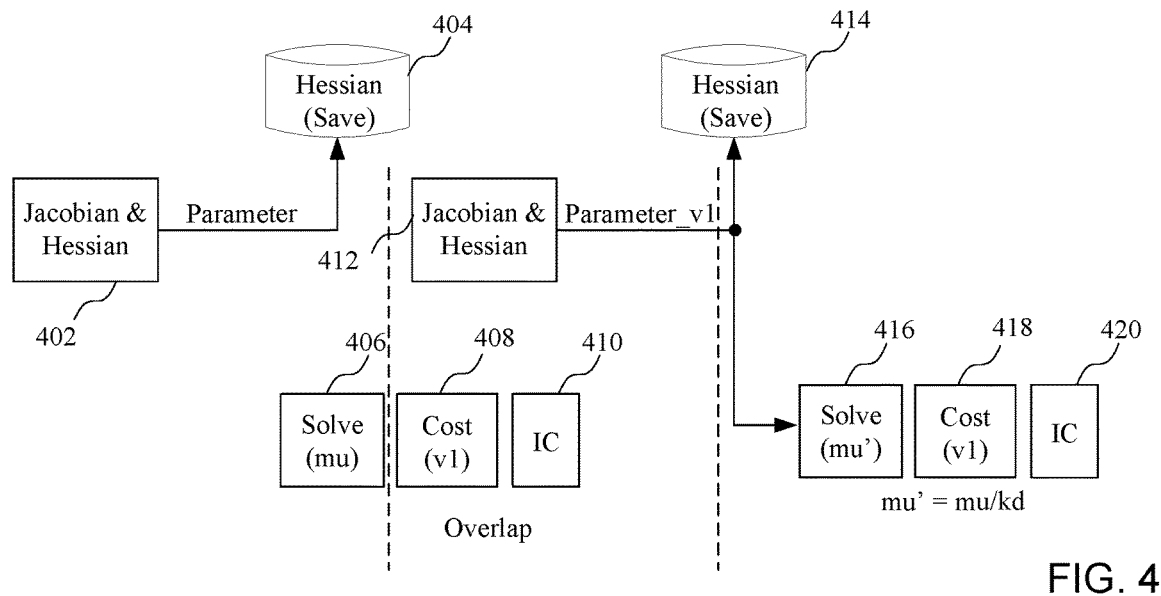
FIG. 4 is a block diagram showing an example of a bundle adjustment operation having successful iterations.
Figure 5:
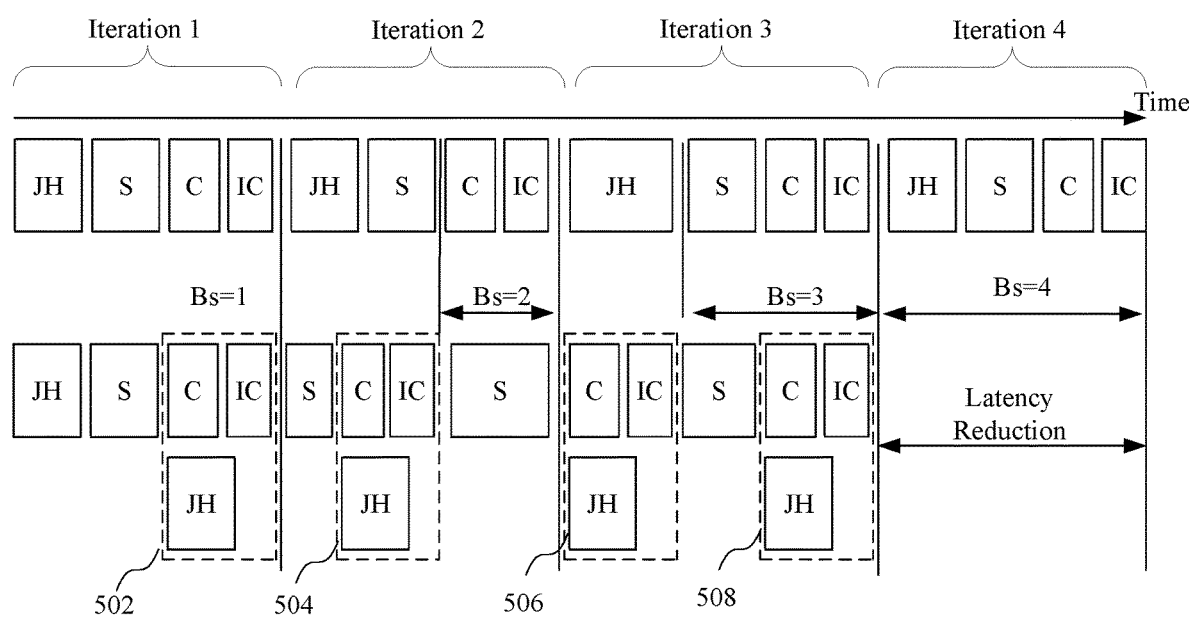
FIG. 5 is a timing diagram showing the latency reduction resulting from the iterative bundle adjustment of FIG. 4.

Turning first to FIG. 4, a block diagram shows an example of a bundle adjustment operation having successful iterations. The implementation of FIG. 4 shows the overlapping of the second Jacobian and Hessian operation that is performed during the cost and IC operations of a first iteration, and the overlapping operations 502-508 for each of the 4 iterations, where the reduced time for the operation is shown in FIG. 5. According to the implementation in FIG. 4, after a parameter is generated by a Jacobian and Hessian block 402 during a first iteration, where the Hessian values are saved in a memory 404, and the solve function is performed by a Solve block 406, a cost function is performed by a Cost block 408 and IC functions are performed by an IC block 410. The second Jacobian and Hessian operation 412 is performed while the cost operation 408 and the LM operation 410 is performed. The result of the second Jacobian and Hessian operation (i.e. Parameter_V1) could be stored in a memory 414. Therefore, a Solve operation, a Cost operation 418 and an IC operation 420 could be performed on the second Jacobian and Hessian block 412. It should be noted that in the case of a successful iteration, only a single Jacobian and Hessian block is necessary to perform the Jacobian and Hessian operation.

As can be seen in FIG. 5, a cost savings can be realized at each stage compared to a conventional circuit arrangement performing BA adjustment (where the 4 iterations of the sequence of functions of a conventional circuit arrangement are shown on the top of FIG. 5), where the overlapping operations 502-508 indicate the overlap of the Jacobian and Hessian operations with the Cost and IC control for each of the 4 iterations. According to the example of FIGS. 4 and 5, success Iterations have $B_s \geq 1$, where Bs is a burst length of success iterations. Assuming that Parameter_v1 is a success, the Iteration control block would perform the following actions: (i) set mu'=mu/Kd (where Kd would be selected to enlarge the search area); (ii) use the Jacobian and Hessian (Parameter_V1) for next iteration; (iii) save the Hessian output for a success branch; and (iv) update iteration state as a success.

Latency reduction can be determined as follows:

$$\delta T_1 = (B_s - 1) \cdot \min(T_{JH}, T_{CLM}), \qquad (3)$$

wherein $T_{JH}$ is equal to the time for the Jacobian and Hessian function operations and $T_{CLM}$ is equal to the time for the Cost and Iteration Control operation (where the iteration control is performed using an LM control block for example). If the first branch of Solve and Cost is a success, the iteration is considered a success, and only one branch is useful in this case. In an embodiment where parallel number P is adaptive, the number of branches can gradually be reduced from P to 1 to save power. The LM control will perform the following operation: Set mu'=mu/Kd; Use the Jacobian and Hessian (Parameter Value V1) for next iteration; save the Hessian output for the success branch; and update iteration state as a success.

Figure 6:
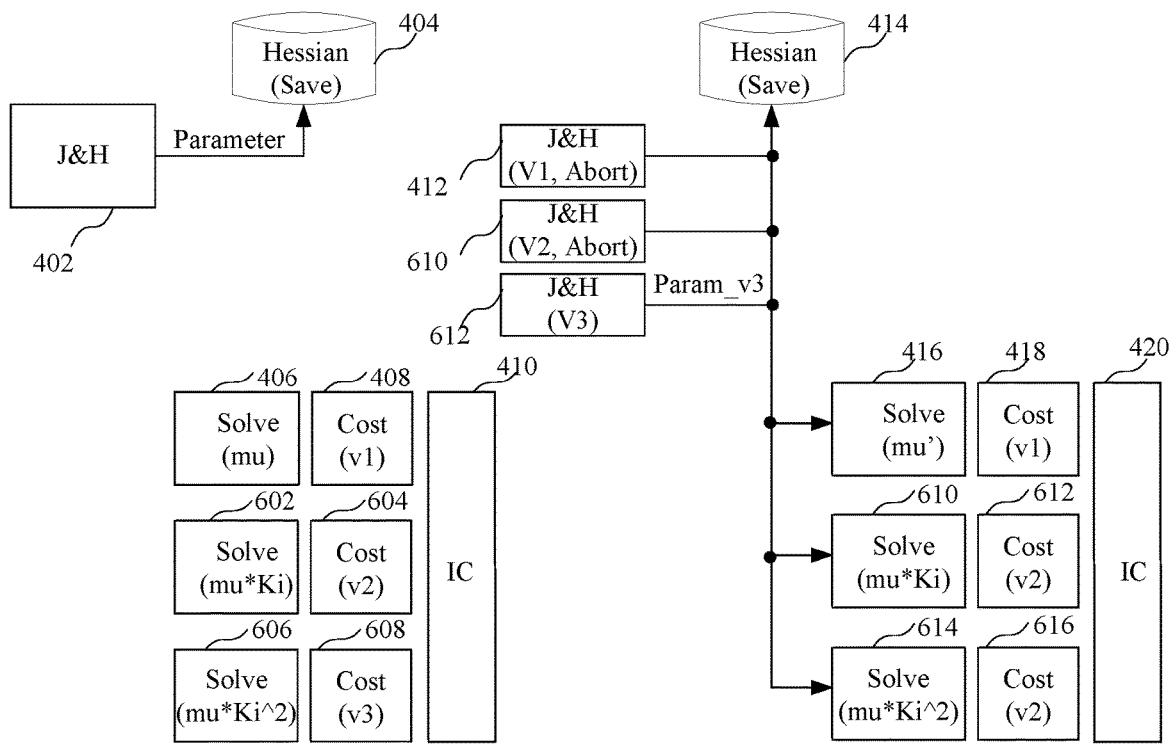
FIG. 6 is an exemplary block diagram showing an example of a bundle adjustment operation having failed iterations that do not exceed a number of parallel branches.
Figure 7:
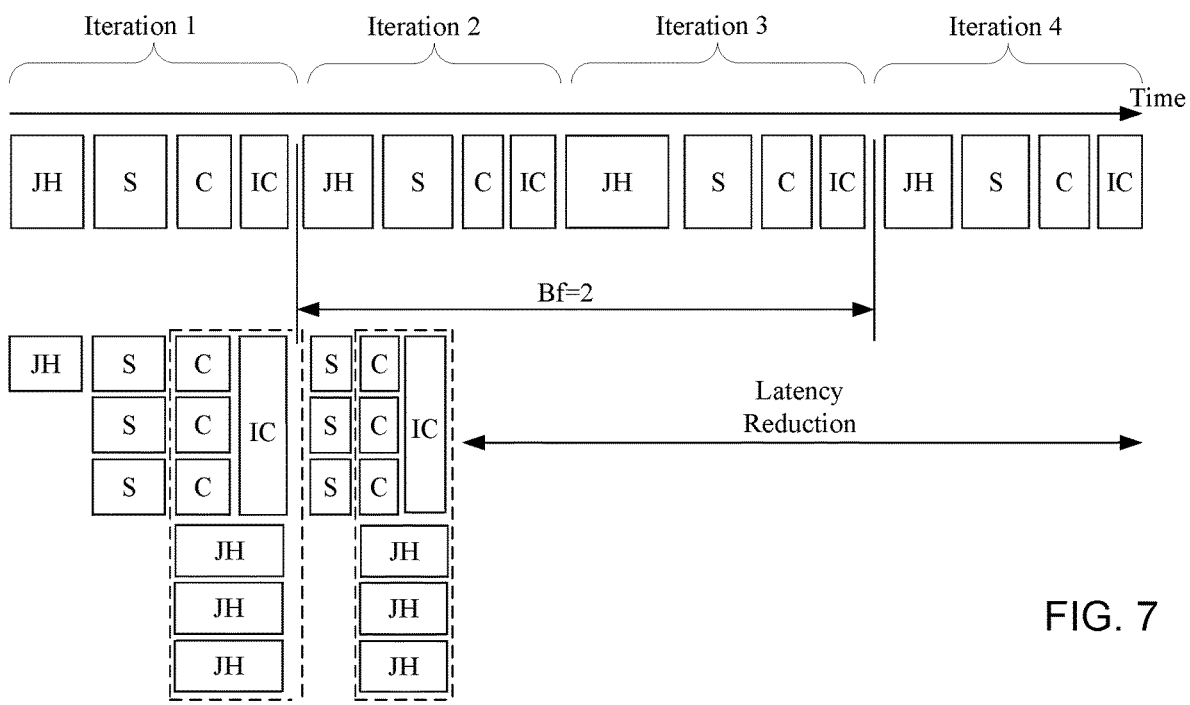
FIG. 7 is a timing diagram showing the latency reduction resulting from the iterative bundle adjustment of FIG. 6.

Turning now to FIG. 6, an exemplary block diagram shows an example of a bundle adjustment operation having failed iterations that do not exceed a number of parallel paths. A timing diagram shows the latency reduction resulting from the iterative bundle adjustment of FIG. 6 is shown in FIG. 7. FIGS. 6 and 7 relate to a case with failed iterations ($1 \leq B_f < P$) where $B_f$ is the burst failure length (i.e. a number of failed cost function determinations), and more particularly the condition where parameter V1 failed (i.e. the cost function was not reduced based upon the parameter), but one/more of other branches are successful. In the case where the burst failure length Bf is less than the number of branches P, the Iteration Control block would perform the following actions: start P Solve branches from Jacobian and Hessian output (i.e. where previous iteration is success); start P Jacobian and Hessian branches after the Solve function is done; select the first success branch (e.g. shown here as Parameter_v3 where the Jacobian and Hessian functions were not started); abort Jacobian and Hessian functions for all branches except the selected one; save the success branch Jacobian and Hessian output and use it for next iteration; set the new mu' based on the success branch (mu'=(mu*Ki^2)/Kd for V3); and update iteration state as a success. Latency Reduction could be determined according to the following equation:

$$\delta T_2 = B_f (T_{JH} + T_S + T_{CLM}) \quad (4)$$

where Ts is equal to the time to perform the solve function.

As shown in FIG. 7 where Bf=2, the second Jacobian and Hessian function can be performed during the first iteration while the cost and LM functions are being performed, and the third Jacobian and Hessian functions can be performed while the second cost and LM functions are performed.

Figure 8:
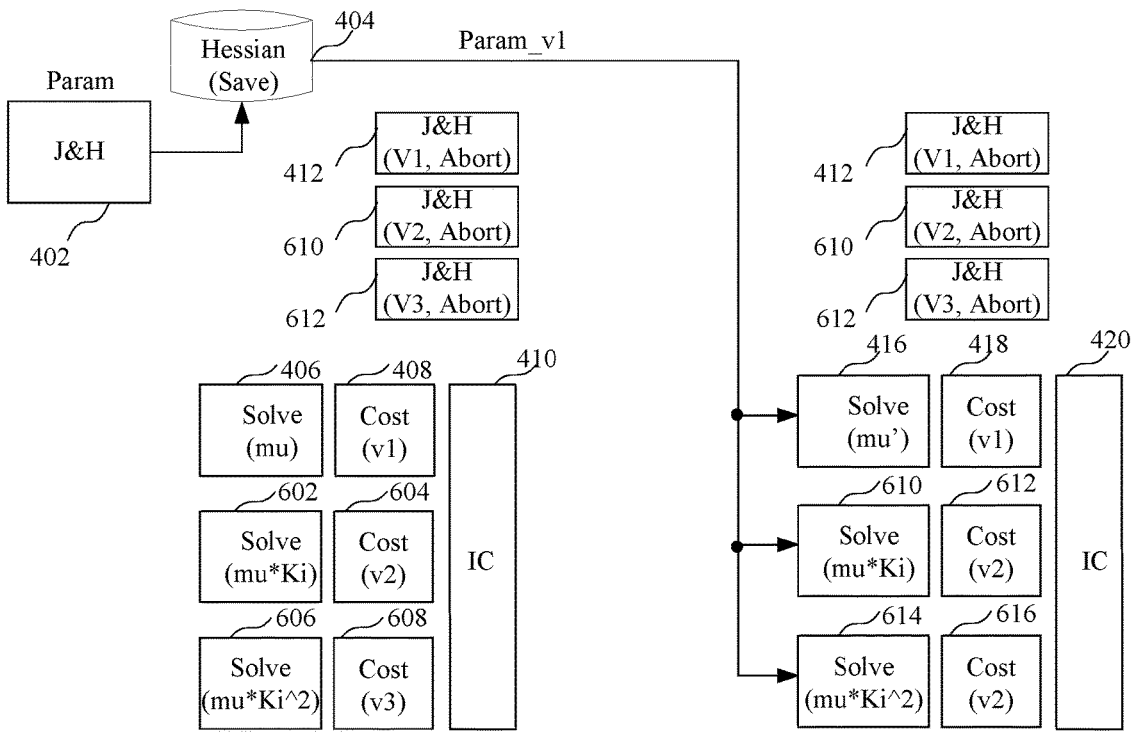
FIG. 8 is an exemplary block diagram showing an example of a bundle adjustment operation having failed iterations that exceed a number of parallel branches.
Figure 9:
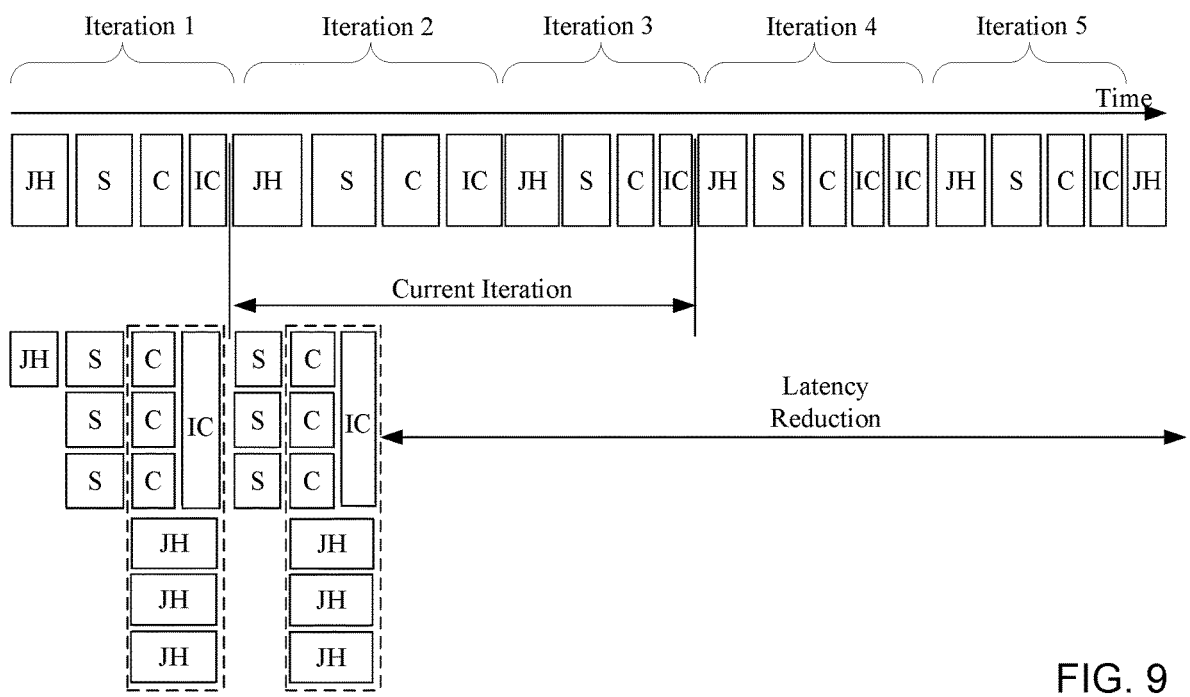
FIG. 9 is a timing diagram showing the latency reduction resulting from the iterative bundle adjustment of FIG. 8.

Turning now to FIG. 8, an exemplary block diagram shows an example of a bundle adjustment operation having failed iterations that exceed a number of parallel paths. A timing diagram of the latency reduction resulting from the iterative bundle adjustment of FIG. 8 is shown in FIG. 9. FIGS. 8 and 9 are associated with the case of failed iterations that are greater than the number of branches ($B_f \geq P$), and corresponds to the condition of P=3 where V1, V2 and V3 all failed. The LM Control block would perform the following action (before end of the burst): start P Solve branch from Jacobian and Hessian output or saved Jacobian and Hessian values based on previous state; abort all P Jacobian and Hessian functions if not finished; set mu' increase from the last branch (i.e. mu'=mu*Ki^3 for P=3); and update iteration state as failed. The LM Control block would perform the following action at the end of burst: start P Solve branches from saved Jacobian and Hessian; and all other operation are same as described above in reference to FIGS. 6 and 7. Latency Reduction in this case could be represented by:

$$\delta T_3 = \left( B_f - \left\lceil \frac{B_f}{P} \right\rceil \right) \cdot (T_{JH} + T_S + T_{CLM}) + \left\lceil \frac{B_f}{P} \right\rceil \cdot \min(T_{JH}, T_{CLM}) \quad (5)$$

As shown in FIG. 9, because of the burst of fails and the use of parallel paths, multiple cost and LM functions can be performed with a stored JH value during a single iteration.

Figure 10:
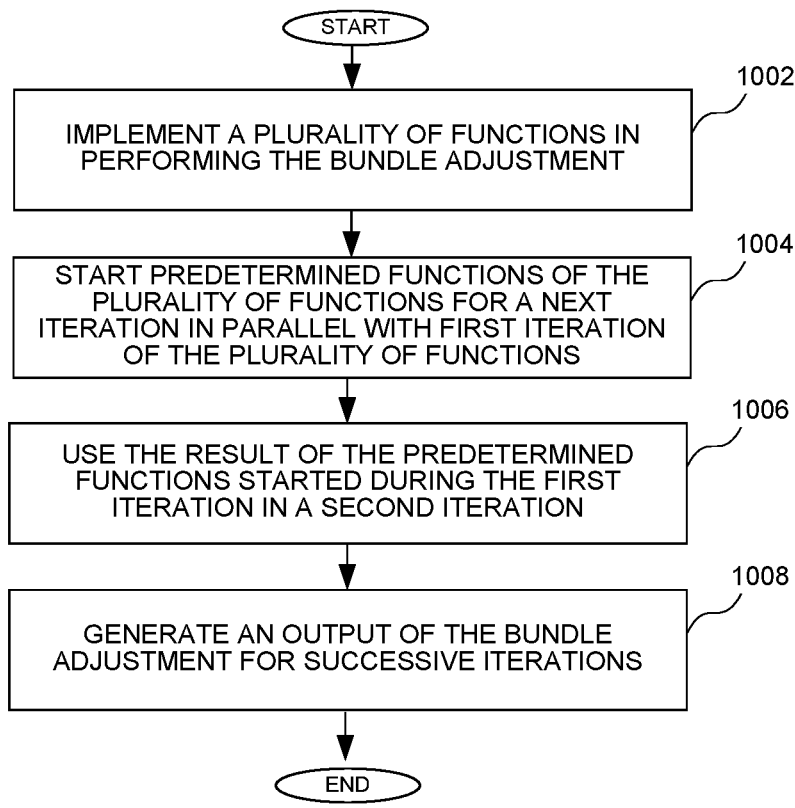
FIG. 10 is a flow chart showing a method of performing an iterative bundle adjustment for an imaging device.

Turning now to FIG. 10, a flow chart shows a method of performing an iterative bundle adjustment for an imaging device. A plurality of functions is implemented in performing the bundle adjustment at a block 1002, such as the functions as described above in reference to FIG. 3 for example. Predetermined functions of the plurality of functions for a next iteration are started in parallel with first iteration of the plurality of functions at a block 1004. For example, Jacobian and Hessian Functions could be started during a first iteration, and used for a second iteration. The result of the predetermined functions started during the first iteration are used in a second iteration at a block 1006. An output of the bundle adjustment is generated for successive iterations at a block 1008.

According to some implementations, the plurality of functions may comprise a Jacobian function, a Hessian function, a solve function, and a cost function, where the predetermined functions started for a next iteration in parallel with the first iteration may comprise the Jacobian function and the Hessian function. A previous valid Jacobian and Hessian solution may be used for the next iteration when the next iteration fails. Also, intermediate results of the predetermined functions may be saved and reused across iterations of performing the bundle adjustment. Starting predetermined functions of the plurality of functions for a next iteration in parallel may comprise performing the predetermined functions on a plurality of branches, wherein a number of the plurality of branches can be adjusted in run-time. The method may further comprise providing a modified LM control based upon results of the cost function for all branches of the plurality of branches.

The various elements of the methods of FIG. 10 may be implemented using the circuits of FIGS. 1-9, including the processor 102, as described, or using some other suitable circuits. While specific elements of the method are described, it should be understood that additional elements of the method, or additional details related to the elements, could be implemented according to the disclosure of FIGS. 1-8.

The benefits of the invention have been evaluated using 10 real datasets. The table below shows the iterations and the bursts for their iterations.

TABLE 1

| Dataset # | Total Iterations | Total Failed | Failed Burst Histogram | Success Burst Histogram |
|---|---|---|---|---|
| Dataset 1 | 9 | 2 | [0, 1, 0] | [1, 0, 0, 0, 0, 1] |
| Dataset 2 | 10 | 1 | [1, 0, 0] | [0, 0, 1, 0, 0, 1] |
| Dataset 3 | 10 | 3 | [0, 0, 1] | [0, 0, 1, 1] |
| Dataset 4 | 5 | 1 | [1, 0, 0] | [1, 0, 1] |
| Dataset 5 | 11 | 3 | [1, 1, 0] | [1, 0, 1, 1] |
| Dataset 6 | 13 | 2 | [2, 0, 0] | [1, 0, 0, 1, 0, 1] |
| Dataset 7 | 6 | 1 | [1, 0, 0] | [0, 1, 1] |
| Dataset 8 | 11 | 3 | [1, 1, 0] | [0, 2, 0, 1] |
| Dataset 9 | 9 | 5 | [0, 0, 0, 0, 1] | [1, 0, 1] |
| Dataset 10 | 15 | 7 | [1, 1, 0, 0] | [1, 2, 1] |

In the last two columns, the histogram of the burst lengths for failed and success iterations are shown, where N-th entry in the histogram represents number of occurrences of length-N burst of failed or passed iterations. For example, [0,0,0,0,1] represents (1 burst of length 5, no shorter burst), and [1, 0, 1] represents (1 burst of length 1 and 1 burst of length 3).

The normalized latency of these datasets is listed in table below, where the existing technology result are compared with the invention for P=1,2,3. In all cases, the invention significantly reduced the latency.

TABLE 2

| Dataset # | Existing Technology Latency | Invention (P = 1) Latency, % Saving | Invention (P = 2) Latency, % Saving | Invention (P = 3) Latency, % Saving |
|---|---|---|---|---|
| Dataset 1 | 27 | 19 (30%) | 17 (37%) | 17 (37%) |
| Dataset 2 | 30 | 21 (30%) | 21 (30%) | 21 (30%) |
| Dataset 3 | 30 | 21 (30%) | 19 (37%) | 17 (43%) |
| Dataset 4 | 15 | 11 (27%) | 11 (27%) | 11 (27%) |
| Dataset 5 | 33 | 23 (30%) | 23 (30%) | 21 (36%) |
| Dataset 6 | 39 | 27 (31%) | 27 (31%) | 27 (31%) |
| Dataset 7 | 18 | 13 (28%) | 13 (28%) | 13 (28%) |
| Dataset 8 | 33 | 24 (27%) | 21 (36%) | 21 (36%) |
| Dataset 9 | 27 | 19 (30%) | 15 (44%) | 13 (52%) |
| Dataset 10 | 45 | 31 (31%) | 25 (44%) | 25 (44%) |

As can be seen in Table 2, the percent savings increases for a given dataset with an increase in the number of branches P. While an increase in the number of branches P requires additional circuit and power resources, power can be reduced by disabling certain branches P depending upon the results of the cost evaluations as described above.

It can therefore be appreciated that new circuits for and methods of performing a Bundle Adjustment for an imaging device have been described. It will be appreciated by those skilled in the art that numerous alternatives and equivalents will be seen to exist that incorporate the disclosed invention. As a result, the invention is not to be limited by the foregoing implementations, but only by the following claims.

We claim:

1. A method of performing an iterative bundle adjustment for an imaging device, the method comprising:
   implementing a plurality of functions in performing a bundle adjustment;
   starting, using a processor, predetermined functions of the plurality of functions for a second iteration of the plurality of functions in parallel with a first iteration of the plurality of functions;
   using a result of the predetermined functions started during the first iteration in the second iteration; and
   generating an output of the bundle adjustment for successive iterations.

2. The method of claim 1, wherein the plurality of functions comprises a Jacobian function, a Hessian function, a solve function, and a cost function.

3. The method of claim 2, wherein the predetermined functions started for a second iteration in parallel with the first iteration comprise the Jacobian function and the Hessian function.

4. The method of claim 2, wherein a previous valid Jacobian and Hessian solution is used for the second iteration when the second iteration fails.

5. The method of claim 1, wherein intermediate results of the predetermined functions are saved and reused across iterations of performing the bundle adjustment.

6. The method of claim 1, wherein starting predetermined functions of the plurality of functions for a second iteration in parallel comprises performing the predetermined functions on a plurality of branches.

7. The method of claim 6 wherein a number of the plurality of branches performing the predetermined functions can be adjusted in run-time.

8. The method of claim 7, further comprising providing iterative control based upon results of a cost function for all branches of the plurality of branches.

9. An imaging device performing an iterative bundle adjustment, the imaging device comprising:
   a processor configured to:
      implement a plurality of functions in performing a bundle adjustment;
      start predetermined functions of the plurality of functions for a second iteration in parallel with a first iteration of the plurality of functions;
      use the result of the predetermined functions started during the first iteration in the second iteration; and
      generate an output of the bundle adjustment for successive iterations.

10. The imaging device of claim 9, wherein the plurality of functions comprises a Jacobian function, a Hessian function, a solve function, and a cost function.

11. The imaging device of claim 10, wherein the predetermined functions started for a second iteration in parallel with the first iteration comprise the Jacobian function and the Hessian function.

12. The imaging device of claim 10, wherein a previous valid Jacobian and Hessian solution is used for the second iteration when the second iteration fails.

13. The imaging device of claim 9, wherein intermediate results of the predetermined functions are saved and reused across iterations of performing the bundle adjustment.

14. The imaging device of claim 9, wherein starting predetermined functions of the plurality of functions for a second iteration in parallel comprises performing the predetermined functions on a plurality of branches.

15. The imaging device of claim 14 wherein a number of the plurality of branches performing the predetermined functions can be adjusted in run-time.

16. The imaging device of claim 15, further comprising providing iterative control based upon results of the cost function for all branches of the plurality of branches.

17. A non-transitory computer-readable storage medium having data stored therein representing software executable by a computer for performing an iterative bundle adjustment, the non-transitory computer-readable storage medium comprising:
   implementing a plurality of functions in performing a bundle adjustment;
   starting predetermined functions of the plurality of functions for a second iteration in parallel with a first iteration of the plurality of functions;
   using a result of the predetermined functions started during the first iteration in the second iteration; and
   generating an output of the bundle adjustment for successive iterations.

18. The non-transitory computer-readable storage medium of claim 17, wherein plurality of functions comprises a Jacobian function, a Hessian function, a solve function, and a cost function.

19. The non-transitory computer-readable storage medium of claim 18, wherein the predetermined functions started for a second iteration in parallel with the first iteration comprise the Jacobian function and the Hessian function.

20. The non-transitory computer-readable storage medium of claim 19, wherein a previous valid Jacobian and Hessian solution is used for the second iteration when the second iteration fails.

* * * * *